(12) United States Patent
Makki et al.

(10) Patent No.: US 8,856,121 B1
(45) Date of Patent: Oct. 7, 2014

(54) EVENT BASED METADATA SYNTHESIS

(75) Inventors: Samy Makki, Hamburg (DE); Jörg Ehrlich, Hamburg (DE); Stefan Makswit, Hamburg (DE); Patrick Wollek, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 538 days.

(21) Appl. No.: 13/096,231

(22) Filed: Apr. 28, 2011

(51) Int. Cl.
*G06F 17/30* (2006.01)

(52) U.S. Cl.
USPC .......................................... 707/736

(58) Field of Classification Search
USPC .................. 707/736; 382/118, 224
See application file for complete search history.

(56) References Cited

U.S. PATENT DOCUMENTS

| 7,813,560 | B2 | 10/2010 | Kraus et al. |
| 2009/0222432 | A1 | 9/2009 | Ratnakar |
| 2009/0222482 | A1 | 9/2009 | Klassen et al. |
| 2009/0319472 | A1 | 12/2009 | Jain et al. |
| 2010/0030806 | A1 | 2/2010 | Kuhlke et al. |
| 2012/0076367 | A1 * | 3/2012 | Tseng ............................ 382/118 |

FOREIGN PATENT DOCUMENTS

WO         2010102515         9/2010

OTHER PUBLICATIONS

Alex Chitu, Google Operating System, Unofficial News and Tips About Google, Picasa Web Becomes Location Aware, Jun. 26, 2007.
Author Unknown, Adobe XMP Developer Center, Jul. 14, 2009.
Author Unknown, Color.com, Take Pictures Together, Apr. 11, 2011.
Jaegwon Kim, Event (philosophy), Kim's Property-Exemplification Account of Events, Wikipedia, Mar. 28, 2011.
Author Unknown, Concert & Event API, http://api.evdb.com/ Mar. 28, 2011.
Author Unknown, Exchangeable Image File Format, Wikipedia, Apr. 11, 2011.
Author Unknown, Jeita CP-3451, Exchangeable Image File Format for Digital Still Cameras: Exif Version 2.2, Standard of Japan Electronics and Information Technology Industries Association, Apr. 2002.
Author Unknown, IBM, System and Method to Enrich Images with Semantic Data, Jul. 30, 2007.
Author Unknown, IBM, Utilizing Metadata Contained in Digital Image Files, Sep. 13, 2007.
Author Unknown, IPTC, Information Technology for News, IPTC Standard, Photo Metadata, Jul. 2010.
Author Unknown, Metadata Working Group, Guidelines for Handling Image Metadata, Version 2.0, Nov. 2010.

* cited by examiner

*Primary Examiner* — Huawen Peng
(74) *Attorney, Agent, or Firm* — Kilpatrick Townsend & Stockton LLP

(57) ABSTRACT

One disclosed method includes determining time and location information for a first digital asset based on a first set of metadata associated with the first digital asset that does not include location information but includes a first time value, and based on a second set of metadata associated with a second digital asset that includes a second time value and a first location value; determining the first digital asset is associated with an event based on a correlation of the determined time and location information for the first digital asset with event time and location information for the event, in which the determined time and location information for the first digital asset includes the first time value and the first location value; and associating the first digital asset with a third set of metadata associated with the event.

13 Claims, 8 Drawing Sheets

| EVENT ID | EVENT NAME | LOCATION | DATE/TIME |
|---|---|---|---|
| 00001 | 2010 World Cup Final | Johannesburg, South Africa | July 11, 2010 |
| 00002 | U2 Concert | GPS (P1, P2) | August 10, 2010 |
| 00003 | David Smith's 60th Birthday | David Smith's Home | June 17, 2010 |

EVENT BASED METADATA SYNTHESIS

BACKGROUND

Digital photographs and digital videos often include various types of metadata. For example, it is common for digital cameras to include a timestamp with each photograph indicating the date and time that the photograph was taken. Some digital camera and/or video recording devices also include global positioning system (GPS) (e.g., stored in an EXIF metadata tag) or other location based metadata associated with each photograph or video.

Software applications exist for organizing and searching digital photographs and/or videos. For example, software applications can use metadata associated with the digital photographs and/or videos for organizing and searching the digital photographs and/or videos. Some software applications include facial recognition functionality to automatically identify and tag persons in photographs and/or videos. Some software applications also allow users to manually tag the photographs and/or videos (e.g., to manually tag persons in a photograph and/or a location of a photograph).

BRIEF DESCRIPTION OF THE DRAWINGS

Various embodiments are disclosed in the following detailed description and the accompanying drawings.

FIG. 4 is a functional diagram of event data for implementing event based metadata synthesis in accordance with some embodiments.

DETAILED DESCRIPTION

Figure 1:
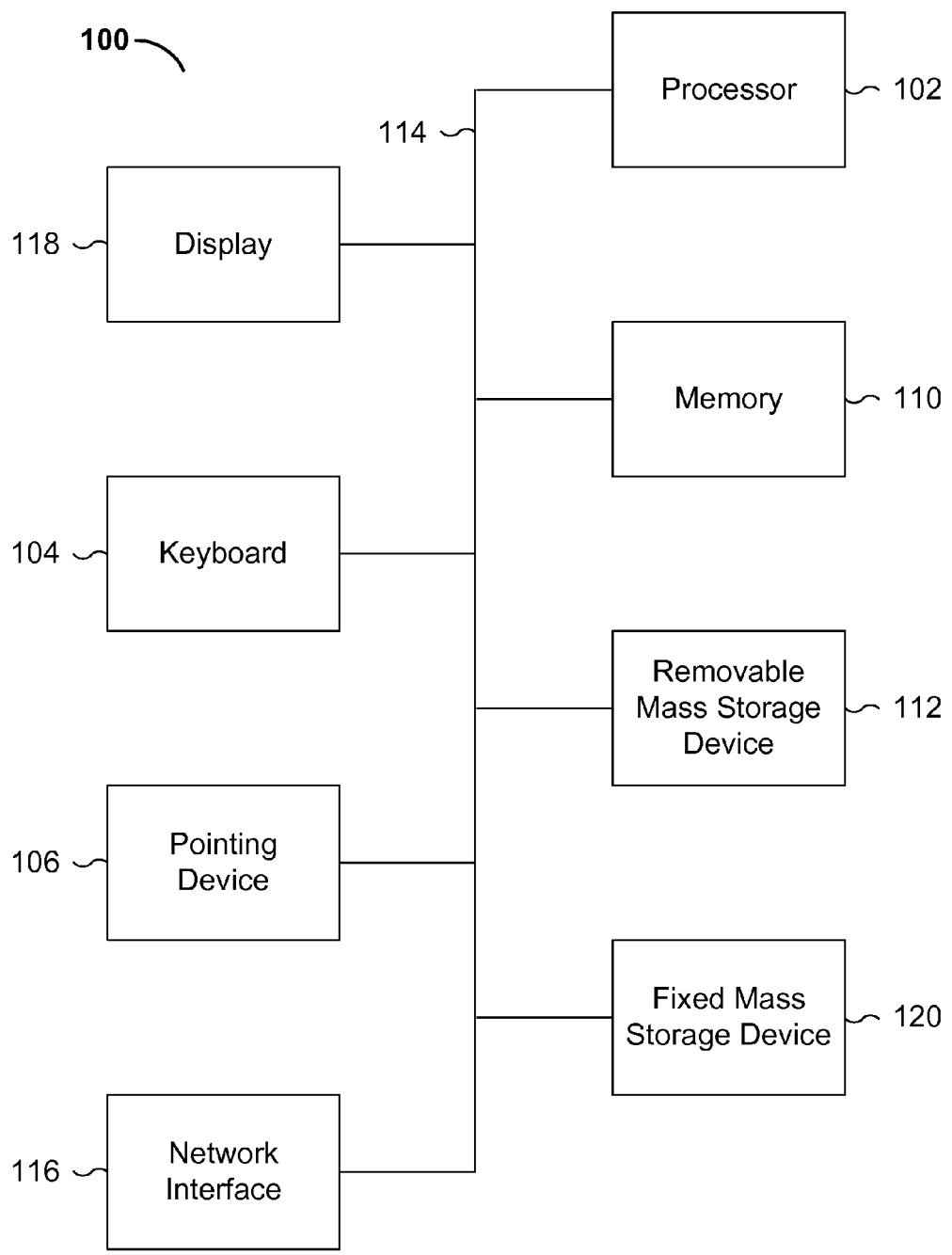
FIG. 1 is a functional diagram illustrating a programmed computer system for executing event based metadata synthesis in accordance with some embodiments.

The various techniques disclosed herein can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosed techniques may take, may be referred to as techniques. In general, the order of the steps of disclosed processes may be altered within the scope of the various techniques disclosed herein. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the various techniques disclosed herein is provided below along with accompanying figures that illustrate the principles of the various techniques disclosed herein. The various techniques disclosed herein are described in connection with such embodiments, but the various techniques disclosed herein are not limited to any embodiment. The scope of the various techniques disclosed herein is limited only by the claims and various techniques disclosed herein encompass numerous alternatives, modifications and equivalents. Numerous specific details are set forth in the following description in order to provide a thorough understanding of various techniques disclosed herein. These details are provided for the purpose of example and various techniques disclosed herein may be practiced according to the claims without some or all of these specific details. For the purpose of clarity, technical material that is known in the technical fields related to various techniques disclosed herein has not been described in detail so that various techniques disclosed herein are not unnecessarily obscured.

Digital assets, such as digital photographs, digital videos, and/or digital audio often include various types of metadata, which can be used to facilitate searching and organizing such digital assets. For example, a user can organize a photo album based on date/time information and/or location information associated with each of the digital photos. Digital capture devices, such as digital cameras/recorders, often include a date/time information (e.g., a timestamp) with each photograph indicating the date and time that the photograph was taken. Some digital camera recording devices and/or digital video/audio recording devices also include global positioning system (GPS) or other location based metadata associated with each photograph or video. Various metadata standards are used to add metadata to digital assets, such as the Exchangeable Image File format (EXIF), Extensible Metadata Platform (XMP), and/or International Press Telecommunications Counsel (IPTC). Also, the Metadata Working Group (MWG) provides specifications for providing interoperability of existing standards and how metadata should be used. These and/or various other proprietary and/or open or standard metadata techniques can be used in accordance with the various embodiments disclosed herein.

However, some devices for generating digital assets do not automatically generate location based information that is associated with each digital asset. As a result, users often have to manually tag each digital asset with such location based information if the user wants to have location based information associated with such digital assets. Such an approach is time consuming and is also generally error prone.

Digital assets are also often associated with a particular event (e.g., a public event, such as photographs from a major sporting event, or a private event, such as a video from a family member's birthday party). Devices generally do not automatically generate event based information that is associated with each digital asset. As a result, users often have to manually tag each digital asset with such event based information if the user wants to have event based information associated with such digital assets. Such an approach is similarly time consuming and is also generally error prone.

What are needed are techniques for efficiently and accurately associating location based information with digital assets that are not automatically tagged with location based information. What are also needed are techniques for efficiently and accurately associating event based information with digital assets that are not automatically tagged with location or event based information. What are also needed are techniques for sharing metadata associated with digital assets from common events with other users who attended such events.

Accordingly, event based metadata synthesis is disclosed herein with respect to various embodiments. In some embodiments, automatic tagging a digital asset with metadata is provided. In some embodiments, associating the digital asset with an event (e.g., a distinct or particular event or a set of possibly matching events) is provided. In some embodiments, synthesis of metadata across a plurality of digital assets (e.g., digital content, such as photographs) is provided.

In some embodiments, determining that a digital asset is associated with an event (e.g., a public event and/or private event) is performed automatically (e.g., without necessarily requiring user input) by using both time and location information associated with the digital asset as described herein with respect to various embodiments. Thus, by providing techniques for efficiently and accurately associating time and location information with digital assets that are not automatically tagged with location based information at capture time, the digital assets can then also be efficiently and accurately associated with an event as described herein with respect to various embodiments. Various other embodiments for event based metadata synthesis (e.g., for finding, categorizing, and/or archiving digital assets, and/or enhancing other metadata information for the digital assets and/or for other digital assets related to a common event, and/or to facilitate other new features and/or workflows for software applications and/or network based services for digital assets) are described herein using various techniques and workflows.

In some embodiments, event based metadata synthesis includes determining time and location information for a first digital asset (e.g., digital content, which can include a photograph, a video, and/or a recording) associated with a first user based on a first set of metadata associated with the first digital asset, in which the first set of metadata does not include location information, and in which the first set of metadata includes a first time value, and based on a second set of metadata associated with a second digital asset associated with a second user, in which the second set of metadata includes a second time value and a first location value; determining the first digital asset is associated with an event based on a correlation of the determined time and location information for the first digital asset with event time and location information for the event, in which the determined time and location information for the first digital asset includes the first time value and the first location value; and associate the first digital asset with a third set of metadata associated with the event.

In some embodiments, event based metadata synthesis includes techniques for synthesizing new metadata for digital assets by associating the digital assets with events (e.g., public and/or private events) based on a context (e.g., contextual information determined from associated metadata and/or user input as needed) and time and location information of space-time specific events (e.g., events associated with particular time/time period and location information, such as a GPS identified location area). For example, by using the parameters of time information (e.g., date/time based information, such as a timestamp, associated with a date/time when the digital asset was captured) and location information (e.g., location based information, such as a location/GPS stamp, associated with a location of the capture device when the digital asset was captured), digital assets can generally be associated with an event (e.g., and/or the number of potentially relevant event matches can be significantly reduced and can be presented to the user for confirmation/verification of the properly matching event based on the suggested potential event matches or event hints). For example, mapping a picture to a distinct space-time context generally reduces the derivable information to a technically feasible set by which the picture can be associated with a particular event and/or the set of possible set matches is reduced to a relatively small number that such can be further examined using other contextual information to identify the matching event and/or user input can be requested for verification and/or confirmation of the matching event. As another example, these techniques can also be used to generate new metadata (e.g., keywords), to improve analysis steps (e.g., face or object detection), and/or transfer/exchange metadata from related digital assets. In some embodiments, additional and/or other parameters can be used for associating (e.g., or uniquely associating) digital assets with a public and/or private event.

In some embodiments, a digital asset (e.g., digital content or digitally captured content) includes a photo, video, or audio recording captured by a capture device. Generally, a digital asset is typically associated with a set of metadata (e.g., metadata properties, such as a timestamp and other technical data) that are created by the capture device. Various embodiments described herein utilize such automatically provided (e.g., tagged) metadata information associated with a digital asset as well as additional techniques to facilitate determination of sufficient context information in order to efficiently and accurately associate the digital asset with an event (e.g., a public or a private event).

In some embodiments, if the digital asset is associated with an event, then additional metadata associated with the event (e.g., an event name, a list of attendees of the event, and/or other event related information) can be used to enrich the digital asset's metadata as further described herein with respect to various embodiments. For example, the new event related information can also be used to synthesize new information or enhance an analysis step of the digital asset's content (e.g., to facilitate/improve facial recognition processing of photographs by including a list of attendees of the event and/or to facilitate/improve object detection in which parameters are trained based on a source set of content that includes, for example, a known attendee and/or other known content elements or known parameters). Speech To Text (STT) is another example in which an attendance list can improve STT results for a digital asset that includes speech content (e.g., audio or video content).

Some capture devices do not include or provide GPS or other location based tracking capabilities. As a result, digital assets captured using such capture devices may only contain creation date/time information, which as a sole parameter of context information is generally insufficient to associate the digital assets to particular events. Accordingly, in some embodiments, social networking techniques are used to determine needed metadata information to provide sufficient context for digital assets in order to associate the digital assets to particular events. For example, two users both attended a common event at which both users captured digital assets using their respective digital capture devices. However, only one of the users used a digital capture device that automatically tags both time and location information to the captured digital assets. A social connection can be determined to exist between these two users (e.g., the users are connected via a social graph as friends, family, and/or professional colleagues). The determination that a social connection exists between these two users in combination with a determination or input that these two users were together during a particular time interval (e.g., and the timestamps of one or more of the digital assets are determined to be within the time interval) can be used to associate such digital assets, and then the location metadata (e.g., and, in some cases, other/additional metadata) can be shared so that both sets of digital assets can be matched with a particular event using the time and location information for the common event. These and various other techniques for using social networking for providing event data matching synthesis are described herein.

FIG. 1 is a functional diagram illustrating a programmed computer system 100 for executing event based metadata synthesis in accordance with some embodiments. As shown, FIG. 1 provides a functional diagram of a general purpose computer system programmed to perform event based metadata synthesis in accordance with some embodiments. As will be apparent, other computer system architectures and configurations can be used to perform event based metadata synthesis. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to execute/perform the techniques described below with respect to FIGS. 2-8.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones (e.g., for digital audio capture), touch-sensitive displays, transducer card readers, tape readers, voice or handwriting recognizers, biometrics readers, cameras (e.g., for digital photograph and/or digital video capture), portable mass storage devices, and other computers.

In addition, various embodiments disclosed herein further relate to computer storage products with a computer readable medium that includes program code for performing various computer-implemented operations. The computer-readable medium is any data storage device that can store data that can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. For example, computer system 100 can be a desktop computer, a laptop computer, a tablet computer, a smart phone, and/or another computing device. Other computer systems suitable for such use can include additional or fewer subsystems. In addition, bus 114 is illustrative of any interconnection scheme serving to link the subsystems. Other computer architectures having different configurations of subsystems can also be utilized.

In some embodiments, computer system 100 includes digital asset capture hardware and/or functionality that can be performed using the computer system 100. For example, computer system 100 can include a digital camera to capture digital photographs and/or digital video. In some embodiments, the computer system 100 automatically tags the captured digital assets with certain metadata, such as a timestamp to indicate the date and time of the capture of the digital asset, and in some cases, can also include a GPS stamp to associate location information with the captured digital asset (e.g., using GPS hardware and/or other location approximation based techniques, such as by approximating a location by network access point information). In some embodiments, the computer system 100 executes software functionality to provide such metadata with the digital asset.

In some embodiments, computer system 100 executes an application for tagging and categorizing digital assets using various techniques described herein. In some embodiments, computer system 100 executes an application for analyzing digital assets using various techniques described herein. In some embodiments, computer system 100 executes an application for communicating with web services for tagging, categorizing, and/or analyzing digital assets using various techniques described herein. For example, computer system 100 can use the network interface 116 for communicating with web services for providing event data metadata synthesis for digital assets using various techniques described herein.

Figure 2:
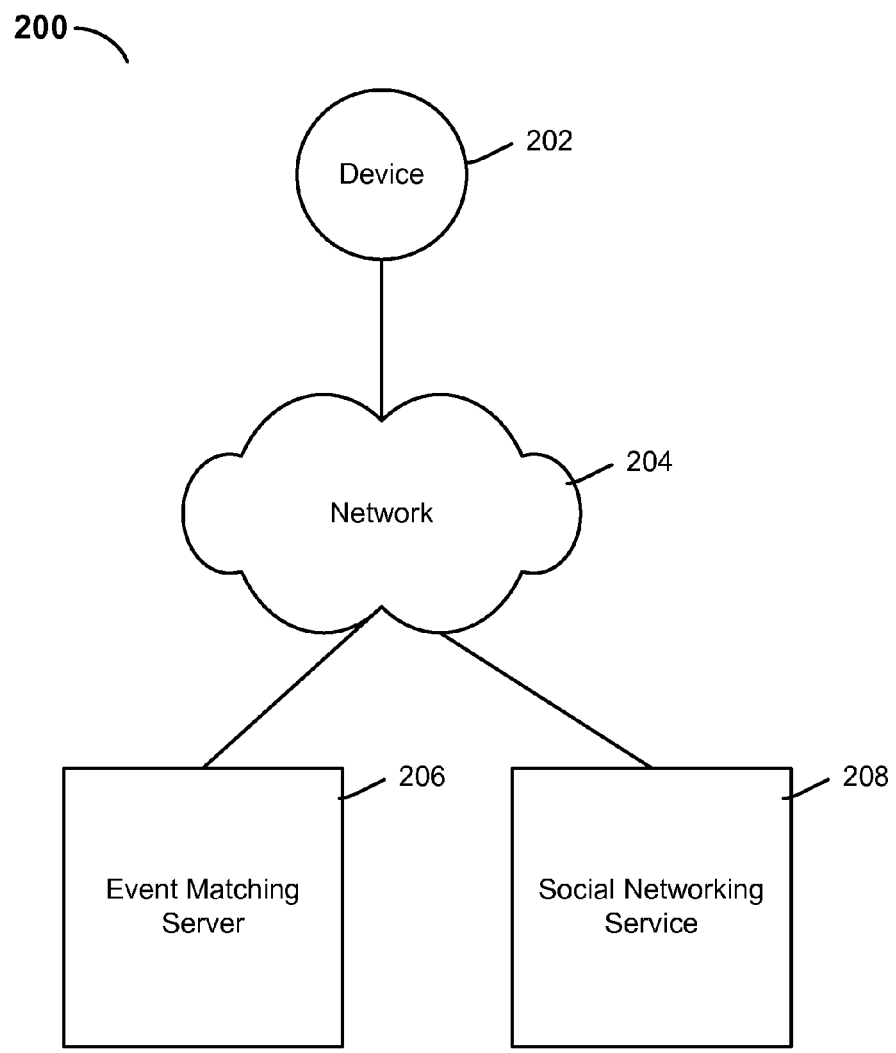
FIG. 2 is a functional architecture diagram for implementing event based metadata synthesis in accordance with some embodiments.

FIG. 2 is a functional architecture diagram 200 for implementing event based metadata synthesis in accordance with some embodiments. As shown, a device 202 (e.g., system 100) can communicate with a network 204 (e.g., using the Internet) to an event matching server 206. For example, device 202 can include a digital asset that has not been associated with an event (e.g., does not include event data metadata). In some embodiments, device 202 communicates with event matching server 206 via the Internet for providing event data metadata synthesis for digital assets using various techniques described herein. For example, event matching server 206 can receive certain context information from device 202 for the digital asset (e.g., a timestamp and a GPS stamp, and//or other context information), and the event matching server 206 can return a matching event (e.g., or a set of possibly matching events to device 202, which can be presented to the user for selection/verification of the properly matching event, if any). As another example, the event matching server 206 can provide additional event data metadata (e.g., in response to a request based on an event parameter, or in combination with a response that provides a response to a request for matching event data based on context information parameters), which can be used by device 202 to execute event data metadata synthesis using various techniques described herein. In some embodiments, events matching server 206 is an events matching service, such as a web service that provides event matching to requests (e.g., using a public or private event API, that receives as parameters various context information, such as a date/time parameter and a location parameter, and returns a matching event, or if no exact match can be determined, a set of possible matches). In some embodiments, the event information is stored locally in a local data store or via communication with a local event matching service. In some embodiments, event information is periodically updated from a local or remote event data source and stored locally at the device.

In some embodiments, an event is understood to occur at a particular space-time interval. In some embodiments, a space-time interval is represented by a geolocation (g) and a temporal interval (t). In some embodiments, assuming an event (E) is not situated in more than one setting at the same time, there is a unique correlation of E=[g, t]. For example, the time interval t can be defined by a start and an ending date/time. The location g can be defined by an area on the world map, which can be expressed with GPS coordinates. Example events include concerts, sport events, and/or private events (e.g., user specific events, such as birthdays, weddings, and/or other personal or private events). In some embodiments, an event data store maintains such event data for various public and/or private events, as discussed in more detail below with respect to FIG. 3.

In some embodiments, digital asset context information is used to associate digital assets with events. In some embodiments, the two primary sources of metadata that can be used as context to associate digital assets with events are the creation date/time when the asset was captured and the GPS location where it has been captured. For example, these properties can be provided for digital assets using the various techniques described herein even if such metadata are not automatically associated with such digital assets at creation/capture time. Such digital asset context information including time and location information is only a point in time and space. This point and time in space can be used to find matching events in the data sources by matching with event data, particularly, geolocation [g] and temporal interval [t] information associated with stored events (e.g., assuming that the point when and where the asset has been captured is located in a geolocation [g] and temporal interval [t] associated with at least one stored event).

An example event API is the Eventful API provided by Eventful, Inc., which provides a worldwide collection of events, taking place in local markets throughout the world, including concerts, sports, and political rallies. As another example, a web service that is associated with a social networking site and/or a web service for digital asset management and services can similarly provide an event API that includes a data store of public and/or private events and implements event matching services based on context information associated with a digital asset for matching the digital asset with a particular event based on event data identifying the event, as described herein with respect to various embodiments.

Figure 3:
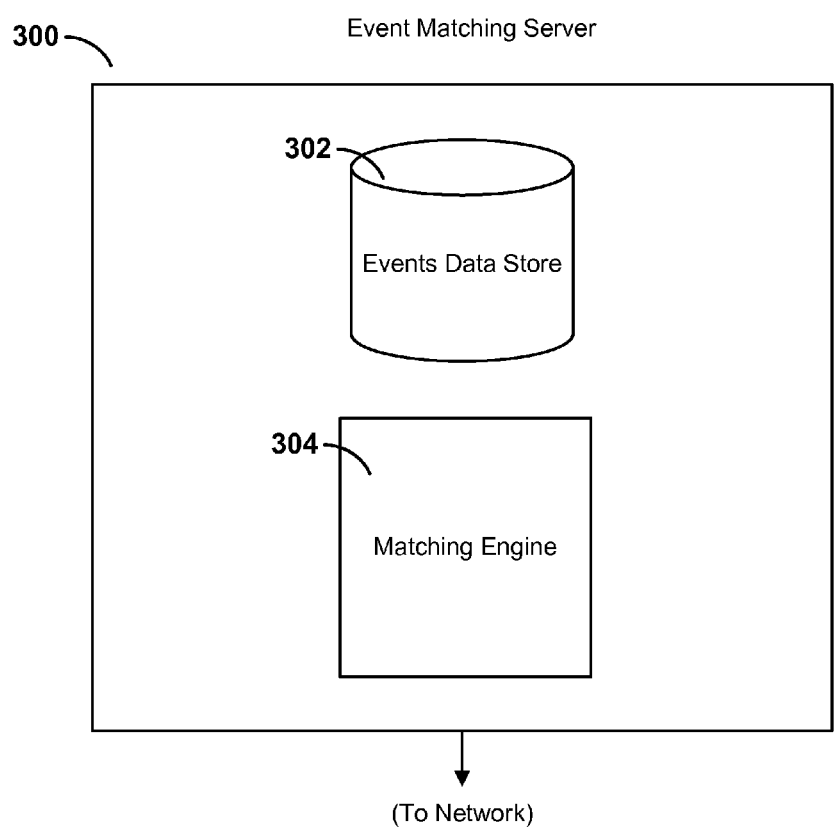
FIG. 3 is a functional diagram of an event server for implementing event based metadata synthesis in accordance with some embodiments.

FIG. 3 is a functional diagram of an event server 300 for implementing event based metadata synthesis in accordance with some embodiments. As shown, event matching server includes an events data store 302. In some embodiments, events data store 302 includes event data identifying a plurality of events. In some embodiments, the event data includes various data for uniquely identifying the stored events, such as date and time information (e.g., a date/time range) and location information (e.g., a geographical area, identified by a particular location name and/or GPS data). In some embodiments, the event data includes additional and/or different data for uniquely identifying the stored events. In some embodiments, the event data also includes various additional data for each event, which can be provided as additional metadata for matched events. Examples of additional event data include event name, list of attendees at the event, keywords, articles, websites, statistics, other related images from the web or from friends, and/or other information. In some embodiments, such additional data for each event that is not necessary for event matching but which can be used for enhancing metadata of matched events is stored in a different or separate data store, such as in an events metadata data store (not shown), which can be stored on the event matching server 300 or on another server/device that is in communication with the event matching server 300. In some embodiments, the event data store 302 is implemented as a database (e.g., a relational, object based, or object-relational database), an indexed set of files, and/or using various other data store techniques for efficient data storage and retrieval.

As also shown, event matching server 300 includes a matching engine 304. Event matching engine 304 performs a matching function that determines a matching event by comparing received digital asset context information (e.g., time and location information) with event data for each of the stored events, in which each of the stored events includes various event data (e.g., geolocation [g] and a temporal interval [t] to map the event to a particular space-time interval as discussed above). In some embodiments, event matching engine 304 returns a set of possible matches (e.g., if more than one event matches the received digital asset context information). In some embodiments, matching engine 304 is implemented as a programmed matching algorithm executed on event matching server 300. In some embodiments, matching engine 304 is implemented on a server, appliance, or computing device that is separate from event matching server 300 but in communication with event matching server 300. In some embodiments, event matching server 300 is implemented as a computer server, a network/storage appliance, and/or another networked computing device capable of storing the events data and executing the matching engine 304 as described herein. In some embodiments, event data matching synthesis is implemented as a network based service (e.g., web service or cloud service). In some embodiments, event data matching synthesis is implemented as a client based application or platform (e.g., Adobe Photoshop®) that executes on a client device (e.g., system 100) at least in part, and also communicates with a remote device (e.g., event matching server 300).

As also shown in FIG. 2, device 200 is in network communication with a social networking service 208 (e.g., Facebook®, MySpace®, LinkedIn®, and/or other social networking sites). In some embodiments, event data metadata synthesis includes utilization of social graph information for enhancing metadata of digital assets as described herein with respect to various embodiments.

FIG. 4 is a functional diagram of event data 400 for implementing event based metadata synthesis in accordance with some embodiments. As shown, event data 400 includes event data for three events. Event data 400 includes the following: Event ID, Event Name, Location (e.g., geolocation [g], such as venue/geographical location name and/or GPS data), and Date/Time (e.g., temporal interval [t]) fields for each of the events. In some embodiments, event data 400 is stored in event data store 302. For example, event data 400 can include event data for public and/or private events. In some cases, the location information can include a very specific location (e.g. GPS data including one or more GPS stamps, such as GPS (P1, P2)), a venue name (e.g., David Smith's Home), and/or a geographical name (e.g., Johannesburg, South Africa). For example, GPS information can include either two geolocation points that define a rectangle on a map or a geolocation point in conjunction with a radius to define a circle on the map, to thereby define a geographical region/area for a particular event. In some cases, the data/time information can include a specific date (e.g., Jul. 11, 2010) or a less precise date/time information, and, for example, can include a date/time range or interval (e.g., Jul. 11, 2010, 12 pm EST-5 pm EST). In some embodiments, event data 400 includes different and/or additional fields. In some embodiments, event data 400 is stored in a table as shown. In some embodiments, event data 400 can be stored in an indexed file or using various other data structures for data storage and retrieval.

Figure 5:
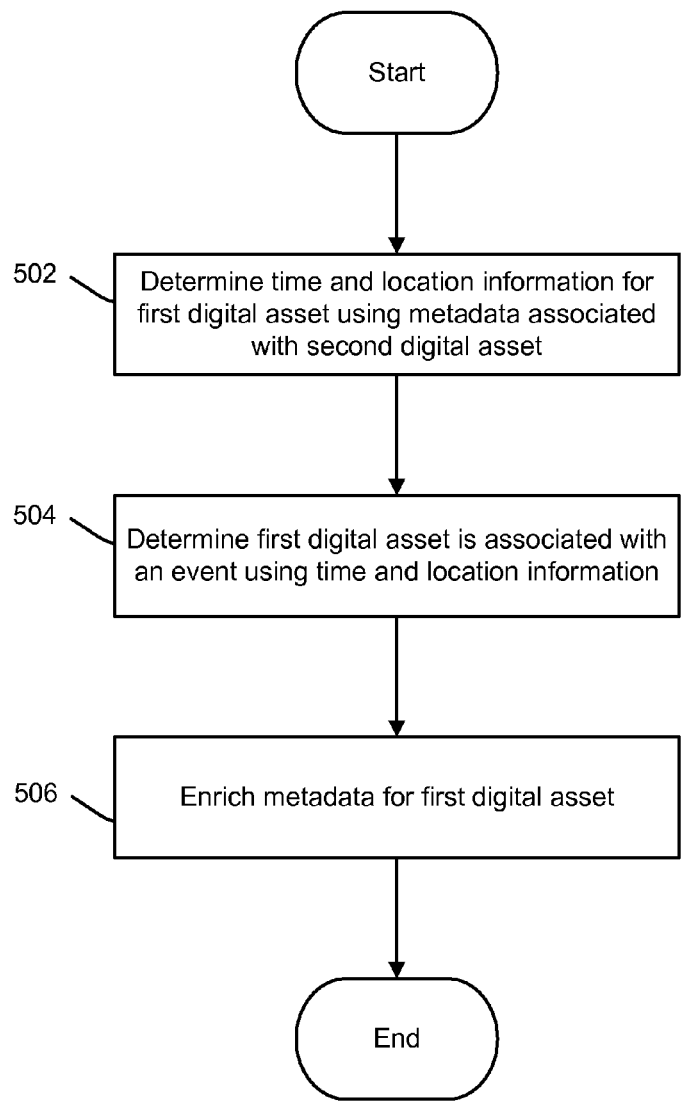
FIG. 5 is a flow diagram for event based metadata synthesis in accordance with some embodiments.

FIG. 5 is a flow diagram for event based metadata synthesis in accordance with some embodiments. At 502, determining time and location information for a first digital asset using metadata associated with a second digital asset is performed. In particular, in some embodiments, determining time and location information for a first digital asset associated with a first user based on a first set of metadata associated with the first digital asset is performed, in which the first set of metadata does not include location information, and in which the first set of metadata includes a first time value, and based on a second set of metadata associated with a second digital asset associated with a second user, in which the second set of metadata includes a second time value and a first location value. At 504, determining the first digital asset is associated with an event using the time and location information is performed. In particular, in some embodiments, determining the first digital asset is associated with an event based on a correlation of the determined time and location information for the first digital asset with event time and location information for the event is performed, in which the determined time and location information for the first digital asset includes the first time value and the first location value. At 506, enriching the metadata for the first digital asset is performed. In particular, in some embodiments, associating the first digital asset with a third set of metadata associated with the event is performed to enrich the metadata for the first digital asset. In some embodiments, requesting event information from an event data service using the determined time and location information for the first digital asset is performed, in which the first digital asset is associated with the event based on a threshold comparison of the time and location information with the event time and location information for the event, and in which the event data service includes event data for a plurality of public events and/or private events in a data store.

In some embodiments, publicly sharing metadata associated with the first digital asset with a plurality of users based on a relationship to the event is provided. In some embodiments, sharing metadata associated with the first digital asset with a plurality of users associated based on a social graph relationship with the first user and based on a relationship to the event is provided.

In some embodiments, determining that the first user and the second user both attended the event is performed; and comparing the first time value to the second time value based on a threshold comparison to determine that the first location value can be provided as relevant location information for the first digital asset is performed.

As discussed above, an exact event match may not be feasible based on the digital asset context information and/or event data, in which case a suggested event match and/or a list/set of possible event matches can be provided. In some embodiments, a potential event match/set of events is presented along with a request to verify that the first digital asset is properly associated with the event based on a confirmation response by the first user.

In some embodiments, associating the first user with the second user based on a social graph associated with a social networking service is performed, in which the social networking service stores a plurality of digital assets for each of the first user and the second user. In some embodiments, associating the first user with the second user based on an automatic tagging and/or manual tagging of persons in the first digital asset is performed, in which the first and second user are connected based on a social graph associated with a social networking service.

In some embodiments, associating an attendee list with the event is provided, in which the attendee list includes a plurality of persons that attended the event, and in which the attendee list is provided as input to a facial recognition service for facilitating facial recognition processing of the first digital asset.

In some embodiments, the third set of metadata is stored separately from the first digital asset and associated with the first digital asset by an event based metadata service for search and organization of a plurality of digital assets for a plurality of users. In some embodiments, the third set of metadata is stored at least in part embedded within the first digital asset, and wherein the third set of metadata facilitates search and organization of the first digital asset based on the event.

Figure 6:
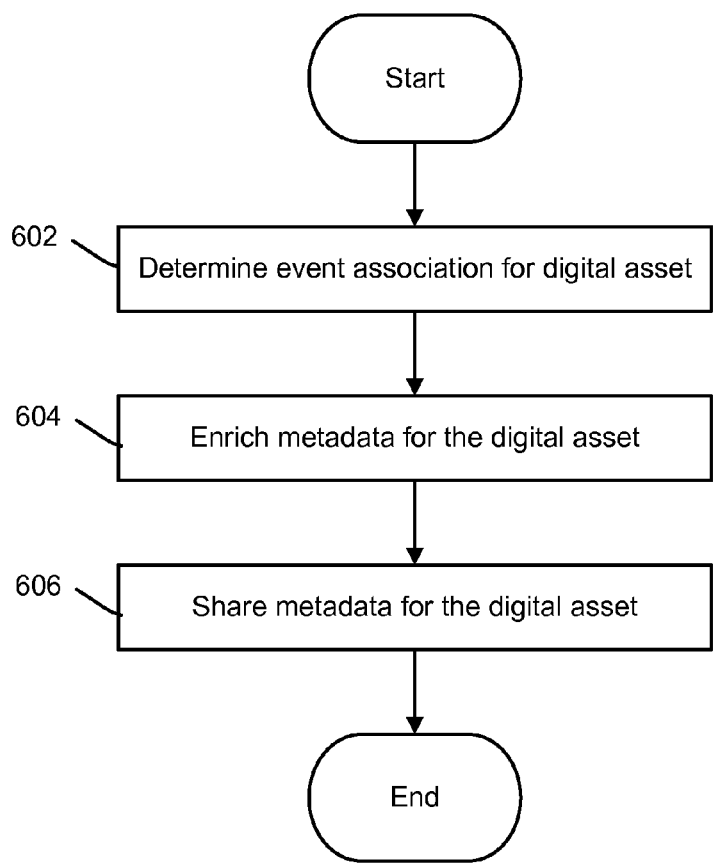
FIG. 6 is another flow diagram for event based metadata synthesis in accordance with some embodiments.

FIG. 6 is another flow diagram for event based metadata synthesis in accordance with some embodiments. At 602, determining an event association for a digital asset is performed. In particular, in some embodiments, determining a digital asset associated with a first user is associated with an event based on a first set of metadata associated with the digital asset and based on event data is performed. At 604, enriching metadata for the digital asset is performed. In particular, in some embodiments, associating the digital asset with a second set of metadata associated with the event is performed. At 606, sharing the metadata for the digital asset is performed. In particular, in some embodiments, sharing the first set of metadata and the second set of metadata associated with the first digital asset with a plurality of users associated based on a social graph relationship with the first user and based on a relationship to the event is performed.

In some embodiments, requesting event information from a remote event data service using time and location information associated with the digital asset is performed, in which the digital asset is associated with the event based on a threshold comparison of the time and location information with event time and location information and/or user input to verify a suggested event match determination, and in which the event data service includes event data for public events and/or private events in a date store. In some embodiments, determining event information from an event data resource associated with the first user using time information associated with the digital asset is performed, in which the local event data resource includes event data for calendar events in a calendar application associated with the first user.

Figure 7:
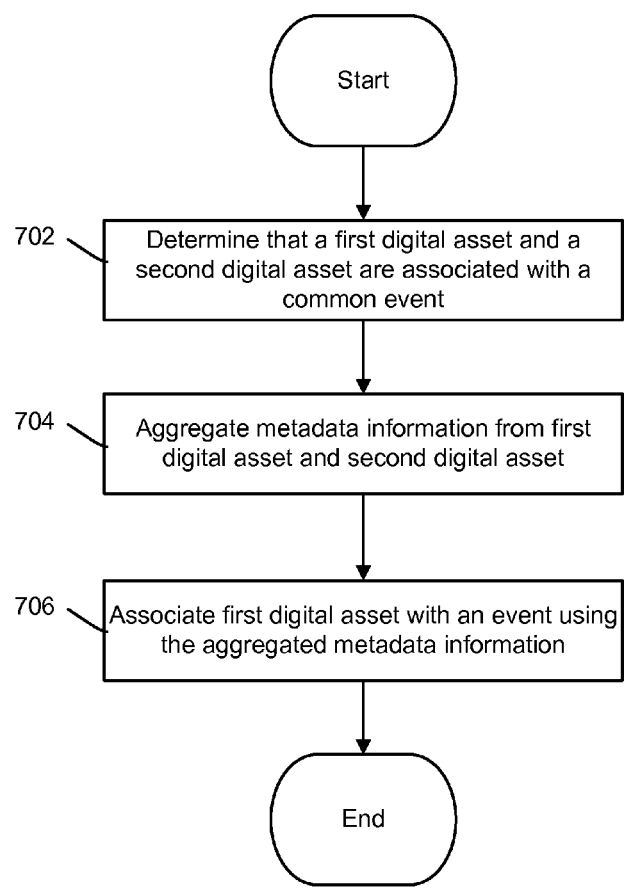
FIG. 7 is another flow diagram for event based metadata synthesis in accordance with some embodiments.

FIG. 7 is another flow diagram for event based metadata synthesis in accordance with some embodiments. At 702, determining that a first digital asset and a second digital asset are associated with a common event is performed. For example, as discussed in the above example, the first digital asset and the second digital asset can both be associated with a common time interval during which the first user and the second user are determined to have been together, and the first user and the second user are determined to have a social connection (e.g., the overlapping time interval alone does not determine that the two users have been together, but the social connection can provide this information and/or other metadata such as facial recognition tags of the other user can provide this needed additional information). In particular, in some embodiments, determining that a first digital asset (e.g., associated with a first user) and a second digital asset (e.g., associated with a second user) are associated with a common event is performed, in which identifying event information associated with the common event is not included in a first set of metadata associated with the first digital asset, and in which the identifying event information associated with the common event is not included in a second set of metadata associated with the second digital asset. At 704, aggregating metadata information from the first digital asset and the second digital asset is performed. In particular, in some embodiments, aggregating a first set of information, in which the first set of information is based on a first set of metadata associated with the first digital asset, and a second set of information, in which the second set of information is based on a second set of metadata associated with the second digital asset, to generate a third set of information. At 706, associating the first digital asset with an event using the aggregated metadata information is performed. In particular, in some embodiments, requesting event information from an event data source to determine that the first digital asset and the second digital asset are each associated with a matched event based on the third set of information is performed.

In some embodiments, verifying that the first event is the matched event based on a confirmation by at least one user associated with either the first digital asset or the second digital asset is performed. In some embodiments, the matched event is a public event or a private event, in which the first set of information includes automatically tagged data, manually tagged data, and/or other context information associated with the first digital asset, and in which the second set of information includes automatically tagged data, manually tagged data, and/or other context information associated with the second digital asset.

In some embodiments, associating the first digital asset with additional metadata associated with the matched event and at least a subset of the second set of information is performed. In some embodiments, associating the second digital asset with additional metadata associated with the matched event and at least a subset of the first set of information is performed.

Figure 8:
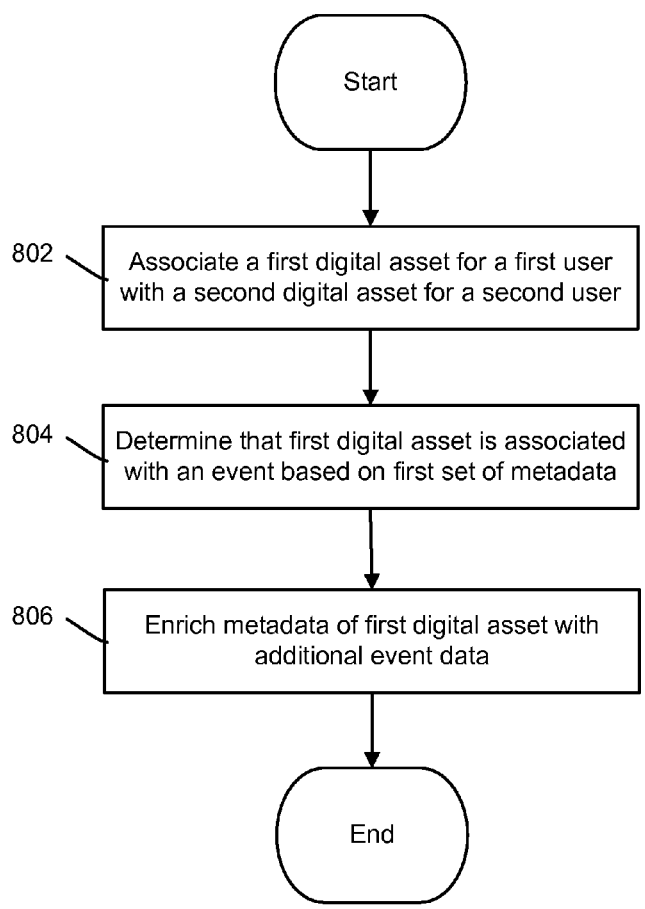
FIG. 8 is another flow diagram for event based metadata synthesis in accordance with some embodiments.

FIG. 8 is another flow diagram for event based metadata synthesis in accordance with some embodiments. At 802, associating a first digital asset for a first user with a second digital asset for a second user is performed (e.g., based at least in part on a social graph relationship between the first user and the second user). For example, as discussed in the above example, the first digital asset and the second digital asset can both be associated with a common time interval during which the first user and the second user are determined to have been together, and the first user and the second user are determined to have a social connection. At 804, determining that the first digital asset for the first user is associated with an event based on a first set of metadata associated with the first digital asset, in which the first set of metadata includes a first time value and a first location value, and based on a second set of metadata associated with a second digital asset for the second user, in which the second set of metadata includes a second time value, a second location value, and a first event value, in which the first time value is within a threshold match of a second time value, and in which the first location value is within a threshold match of the second location value. At 806, enriching metadata of the first digital asset with additional event data is performed. In particular, in some embodiments, associating the first digital asset with a third set of metadata associated with the event is performed, in which the third set of metadata is included within the second set of metadata. In some embodiments, metadata is located in the file itself, such as in the EXIF section of the file, in which case these techniques can be used to update or add such new event data as new metadata in the file (e.g., JPEG files). In some embodiments, cloud based data techniques (e.g., cloud based services) can allow such metadata to be stored in the cloud.

Various techniques for providing event based metadata synthesis are described herein. These techniques can also be applied to various workflows. For example, a social networking site, such as Facebook®, includes event data as well as event attendee information, such as with friends who attended same event. A user can then derive metadata from digital assets (e.g., photographs and/or videos) from other users who attended the same event. In this example, timestamp and association of attendees at such an event can be sufficient to associate the digital assets with this particular event (e.g., GPS data is not required).

As another social network example, if it can be determined that two or more users are connected by a social connection and that during a particular time interval that the users were together (e.g., at a common place or event), then the techniques described herein can be applied to extract sufficient metadata and/or other information (e.g., from manual tagging and/or other sources of context data) from the associated digital assets to aggregate sufficient context information across such users' set of digital assets to associate such digital assets with a particular event. For example, at a photo shooting event (e.g., for a photography agency), photographers can take various photos and can have metadata based on this particular photo shoot event automatically inserted into the photographs (e.g., agency name, copyright information, etc.) to identify that set of photos as part of the event without requiring the photographers to manually tag each of such photos (e.g., this approach can also be used for film shooting events). As another example, various photography platforms/applications, such as Adobe Photoshop Express®, provide a platform for users to share photos based on event association by showing other pictures in a common event frame, which can be implemented using the various techniques and workflows described herein.

As yet another social networking example workflow, digital assets for a first user can be associated with other users who attended an event (e.g., facial recognition software can automatically identify other attendees; a second user who is a friend of the first user can manually tag/provide such information, and/or the first user can do so manually tagging/providing such information and/or using a social networking site's events information, or indicating such information in a calendar; one or more users can provide a hint for a social connection for these digital assets; and/or check-in location related features/functionality for smart phones, tablets, and/or other devices can be used to tag pictures based on event information; and/or various other techniques). In some cases, user verification of other attendee(s) at an event can be required (e.g., using a social graph). Upon determining and possibly verifying other users attended a particular event, associated digital assets of such users can be determined, and then metadata from each associated attendee's digital assets (e.g., GPS/location information, event related information, and/or other information). In some cases, a second user can be associated with an event that the first user attended, in which the first and second users were at same place/common location during a common time period/time interval, and event metadata (e.g., keywords, and/or other event related information) can be added or synthesized with the metadata for the first user's digital assets that are associated with that time period. In some cases, the digital assets for the first user can also be associated with other attendees who are known to have attended the same event, which provides a rich source of metadata that can be publicly shared among users who are determined or known to have attended the event thereby allowing for aggregation and synthesis of metadata across this event/user space.

As will now be apparent in view of the various embodiments described herein, various other workflows can also be provided using these techniques.

Although the foregoing embodiments have been described in some detail for purposes of clarity of understanding, various techniques disclosed herein are not limited to the details provided. There are many alternative ways of implementing various techniques disclosed herein. The disclosed embodiments are illustrative and not restrictive.

What is claimed is:

1. A computer implemented method, comprising:
determining time and location information for a first digital asset associated with a first user based on a first set of metadata associated with the first digital asset, wherein the first set of metadata does not include location information, and wherein the first set of metadata includes a first time value, and based on a second set of metadata associated with a second digital asset associated with a second user, wherein the second set of metadata includes a second time value and a first location value, the time and location information determined by comparing the first time value to the second time value based on a threshold comparison to determine that the first location value can be provided as relevant location information for the first digital asset;
determining the first digital asset is associated with an event based on a correlation of the determined time and location information for the first digital asset with event time and location information for the event, wherein the determined time and location information for the first digital asset includes the first time value and the first location value; and
associating the first digital asset with a third set of metadata stored for the event.

2. The computer implemented method of claim 1 further comprising:
requesting event information from an event data service using the determined time and location information for the first digital asset, wherein the first digital asset is associated with the event based on a second threshold comparison of the time and location information with the event time and location information for the event, and wherein the event data service includes event data for a plurality of public events and/or private events in a data store.

3. The computer implemented method of claim 1 further comprising:
sharing publicly metadata associated with the first digital asset with a plurality of users based on a relationship to the event.

4. The computer implemented method of claim 1 further comprising:
sharing metadata associated with the first digital asset with a plurality of users associated based on a social graph relationship with the first user and based on a relationship to the event.

5. The computer implemented method of claim 1 further comprising:
verifying that the first digital asset is properly associated with the event based on a confirmation response by the first user.

6. The computer implemented method of claim 1 further comprising:
associating the first user with the second user based on a social graph associated with a social networking service, wherein the social networking service stores a plurality of digital assets for each of the first user and the second user.

7. The computer implemented method of claim 1 further comprising:
   associating the first user with the second user based on an automatic tagging and/or manual tagging of persons in the first digital asset, wherein the first and second user are connected based on a social graph associated with a social networking service.

8. The computer implemented method of claim 1 further comprising:
   associating an attendee list with the event, wherein the attendee list includes a plurality of persons that attended the event, and wherein the attendee list is provided as input to a facial recognition service for facilitating facial recognition processing of the first digital asset.

9. The computer implemented method of claim 1, wherein the digital asset includes a photograph, a video, or an audio recording captured using a digital capture device.

10. The computer implemented method of claim 1, wherein the location information includes global positioning system (GPS) data.

11. The computer implemented method of claim 1, wherein the third set of metadata is stored separately from the first digital asset and associated with the first digital asset by an event based metadata service for search and organization of a plurality of digital assets for a plurality of users.

12. The computer implemented method of claim 1, wherein the third set of metadata is stored at least in part embedded within the first digital asset, and wherein the third set of metadata facilitates search and organization of the first digital asset based on the event.

13. A computer program product, the computer program product being embodied in a computer readable storage medium and comprising computer instructions for:
   determining time and location information for a first digital asset associated with a first user based on a first set of metadata associated with the first digital asset, wherein the first set of metadata does not include location information, and wherein the first set of metadata includes a first time value, and based on a second set of metadata associated with a second digital asset associated with a second user, wherein the second set of metadata includes a second time value and a first location value, the time and location information determined by comparing the first time value to the second time value based on a threshold comparison to determine that the first location value can be provided as relevant location information for the first digital asset;
   determining the first digital asset is associated with an event based on a correlation of the determined time and location information for the first digital asset with event time and location information for the event, wherein the determined time and location information for the first digital asset includes the first time value and the first location value; and
   associating the first digital asset with a third set of metadata stored for the event.

* * * * *